US012254820B2

(12) United States Patent
Huang et al.

(10) Patent No.: US 12,254,820 B2
(45) Date of Patent: Mar. 18, 2025

(54) DUAL-LINE CASCADE APPLICATION SYSTEM AND IMPLEMENTATION METHOD THEREOF FOR SIMULTANEOUSLY SUPPLYING ELECTRICAL POWER AND TRANSMITTING DATA

(71) Applicants: SHENZHEN HOME TOWN CHIP MICRO TECHNOLOGY CO., LTD., Guangdong (CN); HUBEI BALIDE TECHNOLOGY CO., LTD., Hubei (CN)

(72) Inventors: Binyang Huang, Guangdong (CN); Qinyang Huang, Guangdong (CN)

(*) Notice: Subject to any disclaimer, the term of this patent is extended or adjusted under 35 U.S.C. 154(b) by 0 days.

(21) Appl. No.: 18/381,650

(22) Filed: Oct. 19, 2023

(65) Prior Publication Data

US 2024/0054946 A1 Feb. 15, 2024

Related U.S. Application Data

(63) Continuation-in-part of application No. 17/952,356, filed on Sep. 26, 2022, now abandoned, which is a (Continued)

(51) Int. Cl.
*G09G 3/32* (2016.01)
*G09G 3/30* (2006.01)
(Continued)

(52) U.S. Cl.
CPC ................ *G09G 3/32* (2013.01); *G09G 3/30* (2013.01); *G09G 3/3208* (2013.01);
(Continued)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS 6,639,848 B2 * 10/2003 Maejima ................ G11C 29/44 365/201
8,661,315 B2 * 2/2014 Huang ................ G11C 17/165 714/763

(Continued)

*Primary Examiner* — Jason M Mandeville

(57) ABSTRACT

A dual-line cascade application system for simultaneously supplying electrical power and transmitting data, including a controller, cascade chips connected to the controller, and LED lights connected to the cascade chips. Each cascade chip is provided with a voltage clamp module, an electrical power supply module, a data storage module, a PWM constant current output driving circuit, an R end (Red LED output end), a G end (Green LED output end), a B end (Blue LED output end), a W end (White LED output end), a VCC/DATA end and a GND/DATA end, as well as a data sampling and calibration module, a power line data sampling and transmission module, a chip initial address setting by command module, a module which determines if E-fuse address of the chip is identical to an address of received data, and an E-fuse module which are sequentially connected. A method using the system is also provided.

4 Claims, 12 Drawing Sheets

Related U.S. Application Data continuation-in-part of application No. 17/185,994, filed on Feb. 26, 2021, now abandoned.

(51) Int. Cl.
*G09G 3/3208* (2016.01)
*H05B 45/345* (2020.01)
*H05B 45/20* (2020.01)

(52) U.S. Cl.
CPC ... *H05B 45/345* (2020.01); *G09G 2310/0202* (2013.01); *G09G 2310/0286* (2013.01); *G09G 2310/0294* (2013.01); *G09G 2320/0693* (2013.01); *G09G 2330/08* (2013.01); *H05B 45/20* (2020.01)

(58) Field of Classification Search
CPC ........... G09G 3/3406; G09G 2330/021; G09G 2330/08; G09G 2310/0202; G09G 2310/0286; G09G 2310/0294; G09G 2320/0693; H05B 45/20; H05B 45/345
USPC ..................................................... 345/76, 212
See application file for complete search history.

(56) References Cited

U.S. PATENT DOCUMENTS

| | | | | |
|---|---|---|---|---|
| 9,830,996 | B2 * | 11/2017 | Yang | G11C 14/0054 |
| 10,827,593 | B1 * | 11/2020 | Lai | H05B 45/20 |
| 2011/0109228 | A1 * | 5/2011 | Shimomura | H05B 45/395<br>315/185 R |
| 2012/0299480 | A1 * | 11/2012 | Peting | H05B 47/185<br>315/185 R |

* cited by examiner

DUAL-LINE CASCADE APPLICATION SYSTEM AND IMPLEMENTATION METHOD THEREOF FOR SIMULTANEOUSLY SUPPLYING ELECTRICAL POWER AND TRANSMITTING DATA

BACKGROUND OF THE INVENTION

The present invention relates to cascade application systems and particularly pertains to a dual-line cascade application system and implementation method thereof for simultaneously supplying electrical power and transmitting data.

An LED display cascade application system comprises a controller, cascade chips and so forth. The controller transmits data; the cascade chips receive data, display and forward data and so forth. Existing LED display cascade application systems are divided into LED display series application systems and LED display parallel application systems.

LED display series application systems need only one controller to generate and transmit data, and the series cascade chips receive data, display and forward data. LED display series application system has the advantage of low costs in respect of general display application effects, as chip address units which are independent and can be set anytime and signal amplifiers are not necessary. In spite of the advantage of low costs, if one of the chips of an LED display series application system is damaged, it would cause subsequent display application error and thus affect the display effect of the entire LED display series application system, resulting in subsequent display error or increase in maintenance and replacement costs. The cascade chips in LED display series application systems now are improved as breakpoint continuous transmission chips where one of the lines is used for data transmission and one or more lines are reserved as communication ports, so as to reduce the possibility of LED display series application system display errors resulted from several defective pixels during application process (as long as the defective pixels are not consecutive, there would be no display error for the LED display series application system). However, it is not possible to avoid completely, and therefore LED display parallel application systems are usually considered in systems where the reliability requirement is high.

In LED display parallel application systems, the controller generates and transmits data and connects to input paths of all parallel chips. With different chip addresses of the parallel chips, data of the corresponding chips is obtained from parallel data lines and displayed. LED display parallel application systems have higher reliability. In an LED display parallel application system, damage of one of the parallel chips would not affect data sampling and display of other parallel chips of the LED display parallel application system. However, LED display parallel systems are higher in costs, as chip address units which can be set anytime are required (using EEPROM chip to package with the parallel chips). Also, IIC protocol is used for communication between the EEPROM chip and the parallel chips. When the system power supply is not stable (system power-on or system power-down after system error and then power-on again), IIC protocol communication error between the EEPROM chip and the parallel chips is possible, resulting in address writing error and thus abnormal display. In existing LED display parallel application systems, standard DMX512 communication protocol is used, in which re-transmission of display data starts from address 0. Assuming that the LED display parallel application system has 200 cascade chips, and next time only the end 100 cascade chips display color change, then the display data is still data of the 200 chips, and the data of the beginning 100 chips is invalid data, thus reducing display date refresh rate. Due to attenuation of transmission signals, it is also necessary to provide signal amplifiers and so forth in the LED display parallel application systems to amplify transmission signals, so as to ensure accurate data sampling and display of the LED display parallel application system.

Therefore, to take care of both costs and performance, existing LED display cascade application systems consider dual-line cascade application which simultaneously supplying electrical power and transmitting data by using only VDD and GND lines to connect cascade application systems, so as to simplify the cascade application system and reduce costs at the same time.

Therefore, a dual-line cascade application system and implementation method thereof for simultaneously supplying electrical power and transmitting data are highly anticipated by the persons skilled in the art.

BRIEF SUMMARY OF THE INVENTION

In view of the disadvantages in the prior art, the present invention provides a dual-line cascade application system and implementation method thereof for simultaneously supplying electrical power and transmitting data to overcome the disadvantages of low reliability and low display refresh rate of existing dual-line cascade application systems.

In order to attain the above objects, the present invention provides the following technical solutions:

A dual-line cascade application system for simultaneously supplying electrical power and transmitting data comprises a controller, cascade chips and LED lights; the controller is connected to the cascade chips; the cascade chips are connected to the LED lights; each of the cascade chips is provided with a voltage clamp module, an electrical power supply module, a data storage module, a PWM constant current output driving circuit, an R end, a G end, a B end, a W end, a VCC/DATA end and a GND/DATA end, as well as a data sampling and calibration module, a power line data sampling and transmission module, a chip initial address setting by command module, a module which determines if E-fuse address of the chip is identical to an address of received data, and an E-fuse module;

the VCC/DATA end is connected to the voltage clamp module, the data sampling and calibration module and the power line data sampling and transmission module respectively; the voltage clamp module has output ends which are connected to the GND/DATA end and the electrical power supply module respectively; the electrical power supply module has an output end which is connected to the data sampling and calibration module, the power line data sampling and transmission module, the chip initial address setting by command module, the E-fuse module, the data storage module and the PWM constant current output driving circuit respectively to supply power; the power line data sampling and transmission module has an output end which is connected to the chip initial address setting by command module, the E-fuse module, and the data storage module respectively; an output end of the module which determines if E-fuse address of the chip is identical to an address of received data is connected to the data storage module; input ends of the module which determines if E-fuse address of the chip is identical to an address of received data are connected to the chip initial address setting by command module and the E-fuse module respectively; the PWM constant current output driving circuit is connected to the R end, the G end, the B end and the W end;

each of the cascade chips is further provided with an oscillation circuit and a reset circuit; the oscillation circuit and the reset circuit are connected between the electrical power supply module and the power line data sampling and transmission module.

Furthermore, the controller is provided with a VDD end and a GND end; the VDD end and the GND end of the controller are connected to the VDD and GND ends of all the cascade chips respectively; each of the LED lights is connected to the R end, the G end, the B end and the W end of each of the cascade chips.

An implementation method of the dual-line cascade application system for simultaneously supplying electrical power and transmitting data of the present invention comprises the following steps:

Step 1: Achieve stable and accurate power and data transmission during cascade application via the voltage clamp module;

Step 2: The controller transmits data to the data sampling and calibration module of a corresponding cascade chip; data transmission criteria is changed in real time via the data sampling and calibration module for accurate data sampling and transmission; after data sampling and transmission, notify the power line data sampling and transmission module to sample and transmit the data which is transmitted to the chip initial address setting by command module, the E-fuse module, or the data storage module;

Step 3: If the data transmitted is determined by the power line data sampling and transmission module as an address writing command, write address on the E-fuse module of the chip and set chip address; otherwise proceed to step 4; wherein writing on the E-fuse module can only performed once, and data written on the E-fuse module is a chip address;

Step 4: If the data transmitted is determined by the power line data sampling and transmission module as setting system data initial address, transmit the data to the chip initial address setting by command module to set the system data initial address; otherwise, proceed to step 5;

Step 5: If the data transmitted is determined by the power line data sampling and transmission module as a display command data, transmit the data to the chip initial address setting by command module, which then transmits the data to the module which determines if E-fuse address of the chip is identical to an address of received data to determine if the chip address stored in the E-fuse module is identical to a chip address of the transmitted data, if yes, notify the data storage module to store a display data of a corresponding address, and the data storage module then transmits the data to the PWM constant current output driving circuit to output and display, if not, then ignore.

Further, in said step 4, after setting the system data initial address by the chip initial address setting by command module, the system data initial address is added by one after receiving a group of display command data;

The present invention has the following beneficial effects: In respect of cascade application, the present invention transmits data with power, thus attaining dual-line cascade application (power line and ground line), and saving manufacture costs. The data sampling and calibration module changes data transmission criteria in real time for accurate data sampling and transmission, thus ensuring accurate data transmission and accurate dual-line cascade application. The E-fuse module can be blown out at any time to determine chip address, thereby simplifying manufacture process and realizing automatic production. Setting chip initial address reduces invalid data, thus increasing refresh rate of dual-line cascade application and improving display effect. To conclude, in respect of cascade application, the present invention ensures accuracy of cascade application, saves manufacture costs, simplifies manufacture process, realizes automatic production, improves display effect and so forth.

DETAILED DESCRIPTION OF THE INVENTION

The present invention is further described in detail herein with the accompanying drawings. It should be noted that, embodiments are given below in accordance with the teachings of the present invention so that a detailed way of implementing the present invention and a detailed operating process of the present invention are disclosed. However, the scope of protection of the present invention should not be limited by the embodiments described below.

Figure 1:
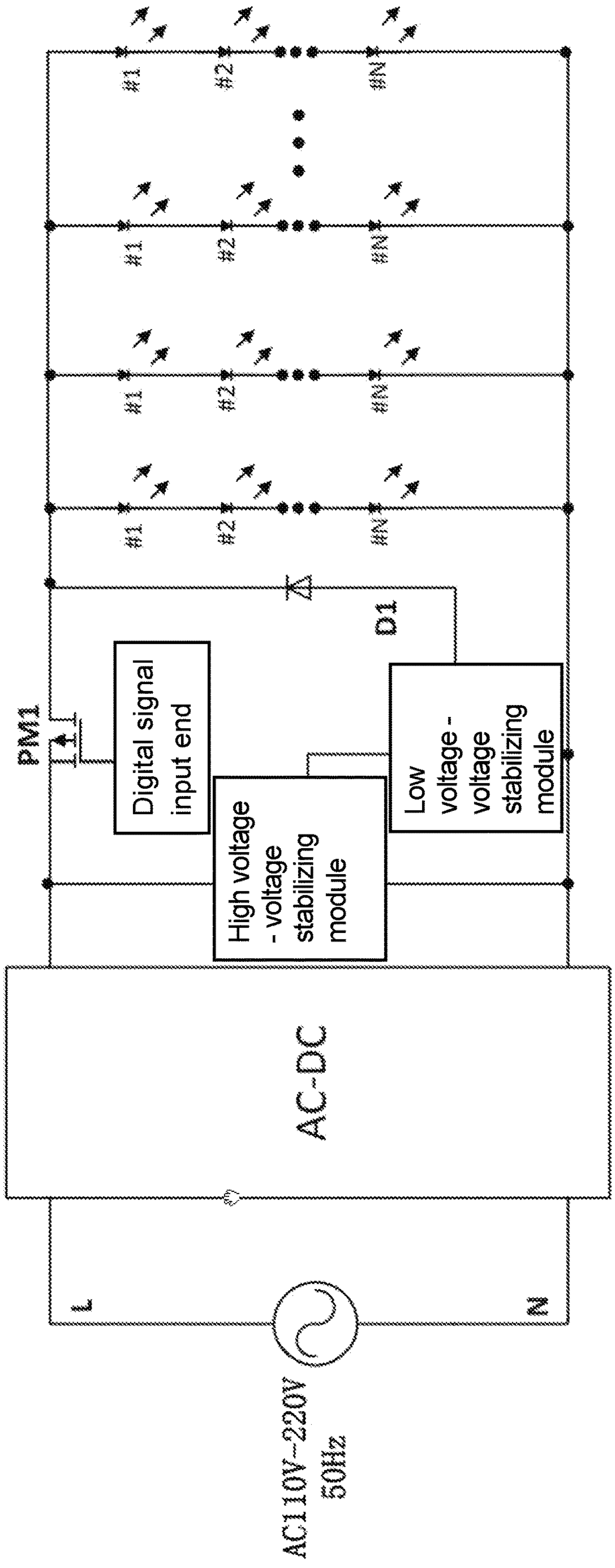
FIG. 1 is a schematic diagram of a dual-line cascade application system.

FIG. 1 is a schematic diagram of a dual-line cascade application system. In the dual-line cascade application system, chips integrally packed with light beads (i.e. each chip is packaged on a light bead frame together with red, green, blue and white LED lights, wherein each chip only has two external connecting ports, namely a VDD end and a GND end) are generally used. In FIG. 1, #1, #2 . . . up to #N represent the chips respectively. An electrical power supply of the dual-line cascade application system is connected to the VDD end of chip #1, the GND end of chip #1 is connected to the VDD end of chip #2, and so and so forth. The GND end of chip #N−1 is connected to the VDD end of chip #N, and the GND end of chip #N is connected to a ground of the dual-line cascade application system.

An operating voltage of each chip is defined as VH, and a data transmission voltage of each chip is defined as VL. A duration time TO of the data transmission voltage VL is defined as code #0 of data transmission, a duration time T1 of the data transmission voltage VL is defined as code #1 of data transmission, and a duration time T2 of the data transmission voltage VL is defined as code #End of data transmission. Each chip, by determining the duration time of the data transmission voltage VL at the VDD end, correctly determines and receives the data transmission (code #0, code #1 or code #End) in the dual-line cascade application system. An address of the received data is compared with a E-fuse address of the chip (wherein in each received set of communication data, the address of the received data is a chip initial address plus one), and if the two addresses are identical, update display data, if not identical, ignore display data.

Figure 2:
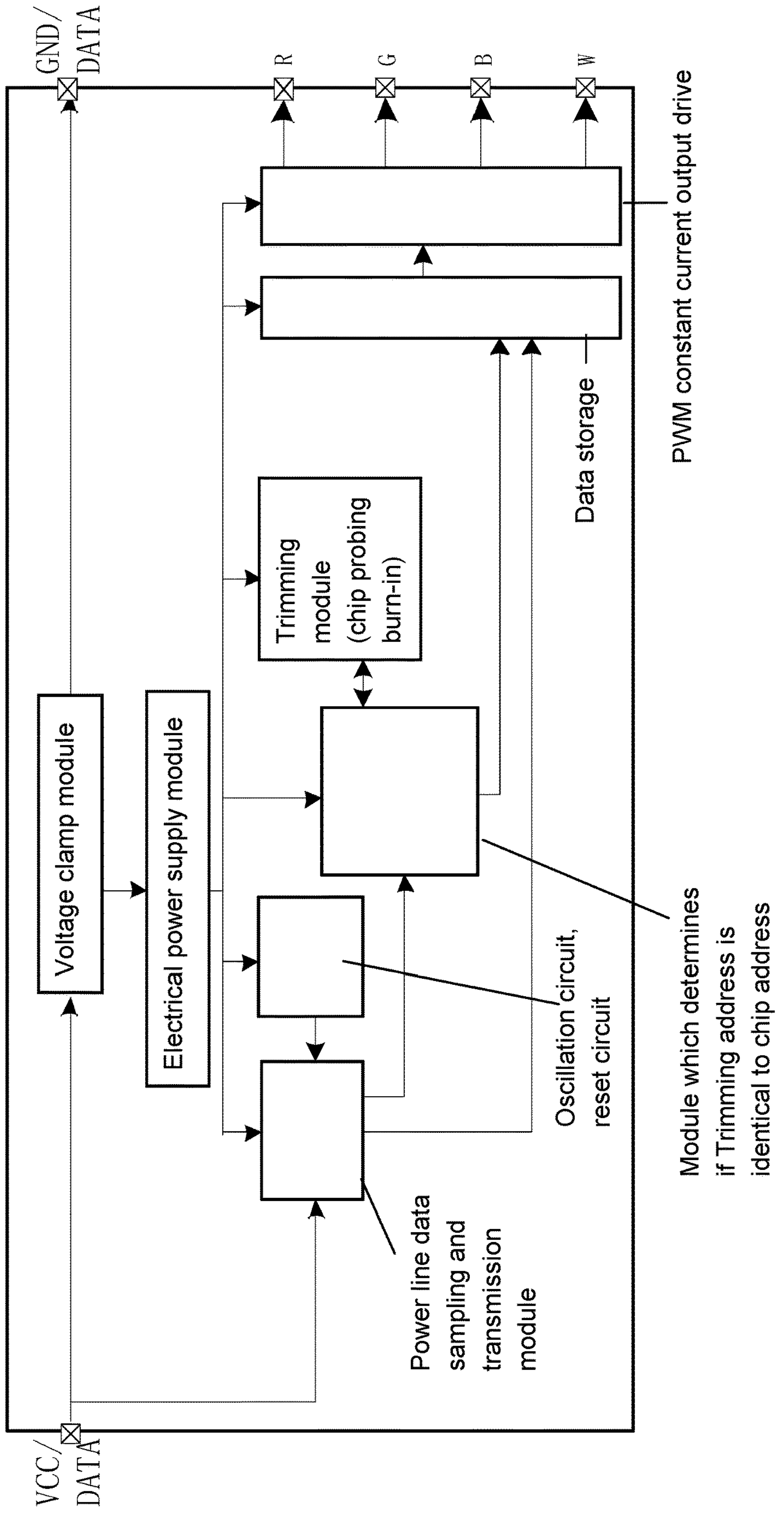
FIG.2 (Prior Art)
FIG. 2 is a schematic block diagram of the internal circuit of a conventional dual-line cascade chip.

FIG. 2 is a schematic block diagram of the internal circuit of a conventional dual-line cascade chip. At this time, the cascade chip performs data sampling and transmission directly from the power line. When the dual-line cascade application system has a greater length, that is when more cascade chips are connected in series/parallel in the dual-line cascade application system, parasitic resistance and capacitance will easily result in abnormal data transmission on the power line (the width of high voltage becomes longer or shorter), and thereby causing address writing error, abnormal display and so forth. At the same time, in conventional dual-line cascade application systems, data transmission includes address and display; there is more date in a cascade chip, and thus fewer cascade chips are required in dual-line cascade application systems under same refresh rate. During chip probing, Trimming module is blown out to determine chip address; the dual-line cascade application system uses camera visual identification, phototransistor identification or the like to cooperate with predetermined addressing program to complete cascade chip addressing during manufacture; the manufacture costs are high, and the manufacture processes are complex.

Figure 3:
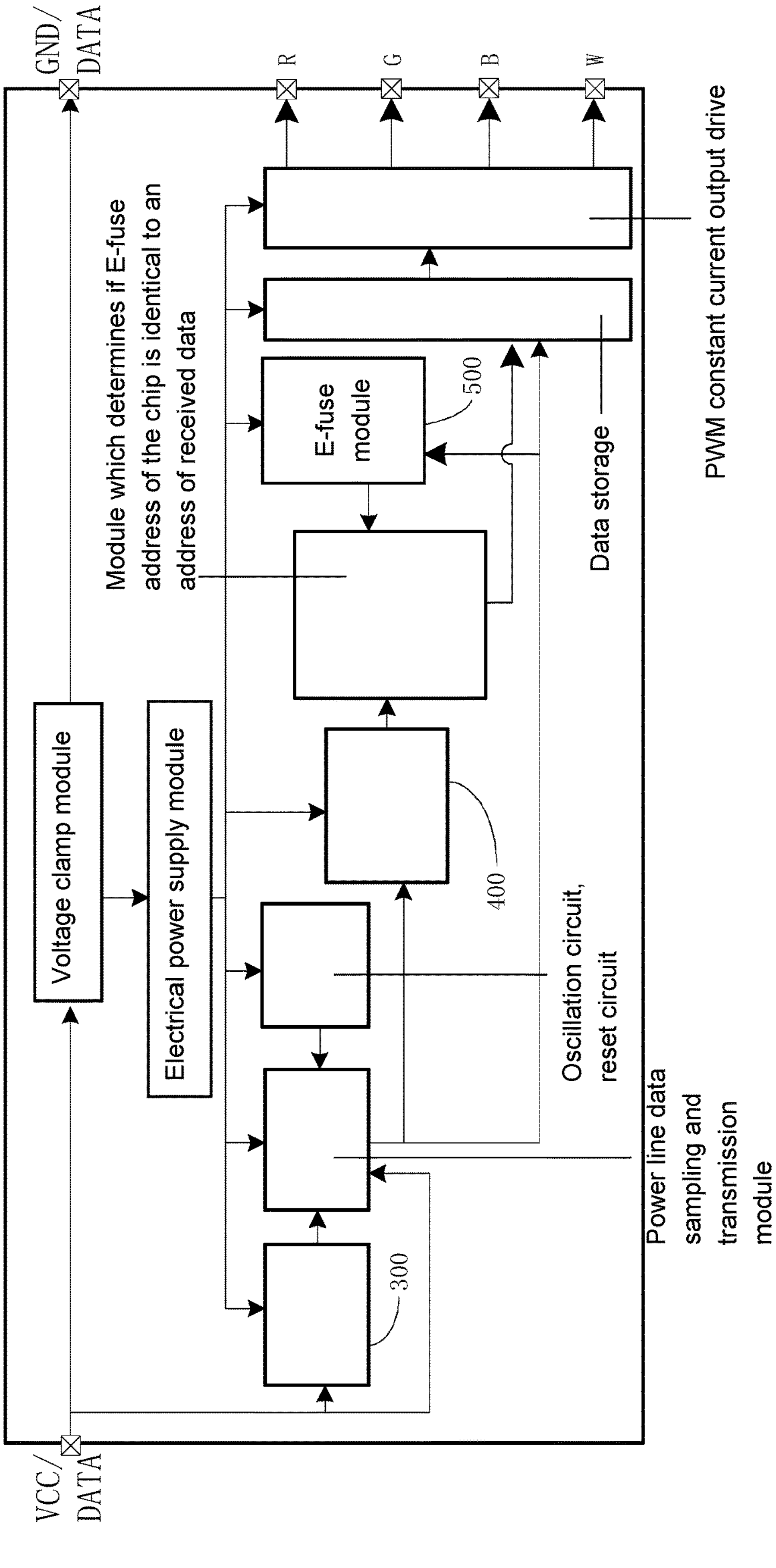
FIG. 3 is a schematic block diagram of the internal circuit of the dual-line cascade chip of the present invention.

FIG. 3 is a schematic block diagram of the internal circuit of the dual-line cascade chip of the present invention. At this time, E-fuse module address is used instead of Trimming module; a data sampling and calibration module is added; a chip initial address setting by command module, a module for determining if E-fuse address of the chip is identical to an address of received data, and so forth are also added. When the dual-line cascade application system has a greater length, that is when more cascade chips are connected in series/parallel in the dual-line cascade application system, parasitic resistance and capacitance result in abnormal data transmission on the power line (the width of high voltage becomes longer or shorter). The dual-line cascade chips of the present invention, by means of the data sampling and calibration module, can still accurately sample and transmit data, thereby ensuring accurate functionality. Specifically, the data sampling and calibration module determines a subsequent code #0, code #1 or code #End based on a width of a first sampled data. Each of the dual-line cascade chips of the present invention is additionally provided with a chip initial address setting by command module, so that transmission of data can command setting of system data initial address, and the address sequence is then added by one, thereby reducing transmission data bits of each chip, and increasing the number of cascade chips of the dual-line cascade application system under same refresh rate. The E-fuse module can be blown out to determine chip address at any time in the cascade chips (e.g. it is possible to blow out the E-fuse module to determine chip address during manufacture), so the dual-line cascade application system can blow out and determine chip address during manufacture as requested, generate dual-line cascade application system according to the sequence defined by the controller, and receive data transmitted from the controller and display correctly. The manufacturing costs are low and the manufacturing processes are simple.

Figure 4:
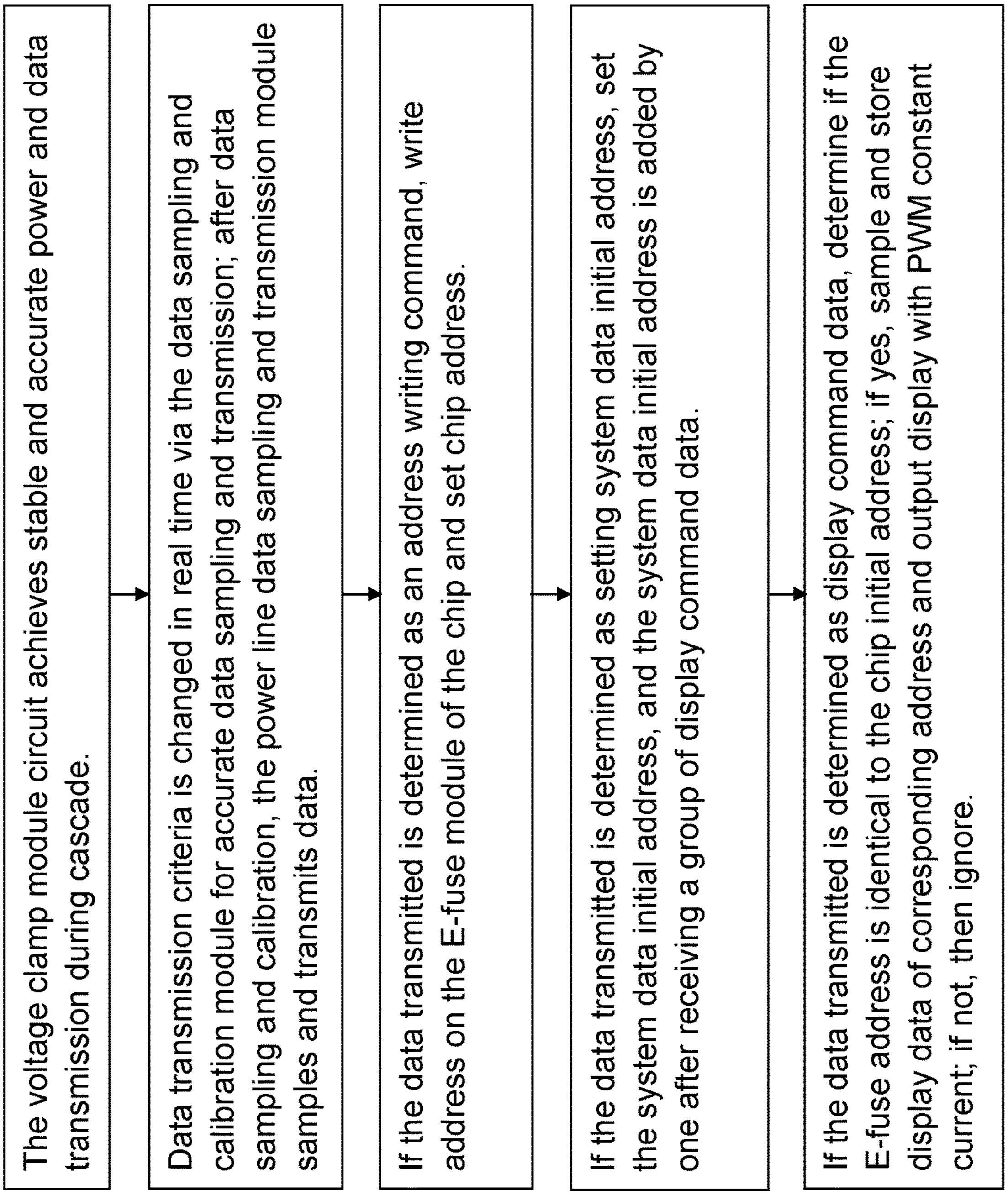
FIG. 4 is a schematic diagram of the implementation steps of the present invention.

With reference to FIGS. 1, 3 and 4, the dual-line cascade application system for simultaneously supplying electrical power and transmitting data of the present invention comprises a controller, cascade chips and LED lights. The controller is connected to the cascade chips; the cascade chips are connected to the LED lights. Each of the cascade chips is provided with a voltage clamp module (the voltage clamp module achieves stable and accurate power and data transmission during cascade application), an electrical power supply module, a data storage module, a PWM constant current output driving circuit, an R end, a G end, a B end, a W end, a VCC/DATA end and a GND/DATA end, as well as a data sampling and calibration module, a power line data sampling and transmission module, a chip initial address setting by command module, a module which determines if E-fuse address of the chip is identical to an address of received data, and an E-fuse module (for storing chip address, and the E-fuse is blown out to determine different chip addresses anytime during manufacture and application process to facilitate manufacture and application).

The VCC/DATA end is connected to the voltage clamp module, the data sampling and calibration module and the power line data sampling and transmission module respectively. The voltage clamp module has an output end which is connected to the GND/DATA end and the electrical power supply module respectively. The electrical power supply module has an output end which is connected to the data sampling and calibration module, the power line data sampling and transmission module, the chip initial address setting by command module (when it is determined that a received data is a chip initial address setting by command data, set a system data initial address and a chip initial address etc), the module which determines if E-fuse address of the chip is identical to an address of received data, the E-fuse module, the data storage module and the PWM constant current output driving circuit respectively. The power line data sampling and transmission module has an output end which is connected to the chip initial address setting by command module, the E-fuse module, and the data storage module respectively. An output end of the module which determines if E-fuse address of the chip is identical to an address of received data is connected to the data storage module; input ends of the module which determines if E-fuse address of the chip is identical to an address of received data are connected to the chip initial address setting by command module and the E-fuse module respectively; the data storage module is connected to the PWM constant current output driving circuit; and the PWM constant current output driving circuit is connected to the R end, the G end, the B end and the W end to supply power.

Each of the cascade chips is further provided with an oscillation circuit and a reset circuit. The oscillation circuit and the reset circuit are connected between the electrical power supply module and the power line data sampling and transmission module.

Furthermore, the controller is provided with a VDD end and a GND end. The VDD end and the GND end of the controller are connected to the VDD and GND ends of all the cascade chips respectively. Each of the LED lights is connected to the R end, the G end, the B end and the W end of each of the cascade chips.

As illustrated in FIG. 3, the implementation method of the dual-line cascade application system for simultaneously supplying electrical power and transmitting data of the present invention comprises the following steps:

The cascade chips are powered on, and the voltage clamp module achieves stable and accurate power and data transmission during cascade application;

The controller transmits data to the data sampling and calibration module 300 of the cascade chips; the cascade chips change data transmission criteria in real time via the data sampling and calibration module 300 for accurate data sampling and transmission. After data sampling and transmission, the power line data sampling and transmission module samples and transmits data which is transmitted to the chip initial address setting by command module 400, the E-fuse module 500, or the data storage module;

If the data transmitted is determined by power line data sampling and transmission module as an address writing command, write address on the E-fuse module 500 of the chip and set chip address;

If the data transmitted is determined by power line data sampling and transmission module as setting system data initial address, transmit the data to the chip initial address setting by command module sets the system data initial address;

If the data transmitted is determined by the power line data sampling and transmission module as a display command data, transmit the data to the chip initial address setting by command module, which then transmits the data to the module which determines if E-fuse address of the chip is identical to an address of received data to determine if the chip address stored in the E-fuse module 500 is identical to the chip address of the transmitted data, if yes, notify the data storage module to store a display data of a corresponding address, and the data storage module then transmits the data to the PWM constant current output driving circuit to output and display, if not, then ignore.

Figure 5:
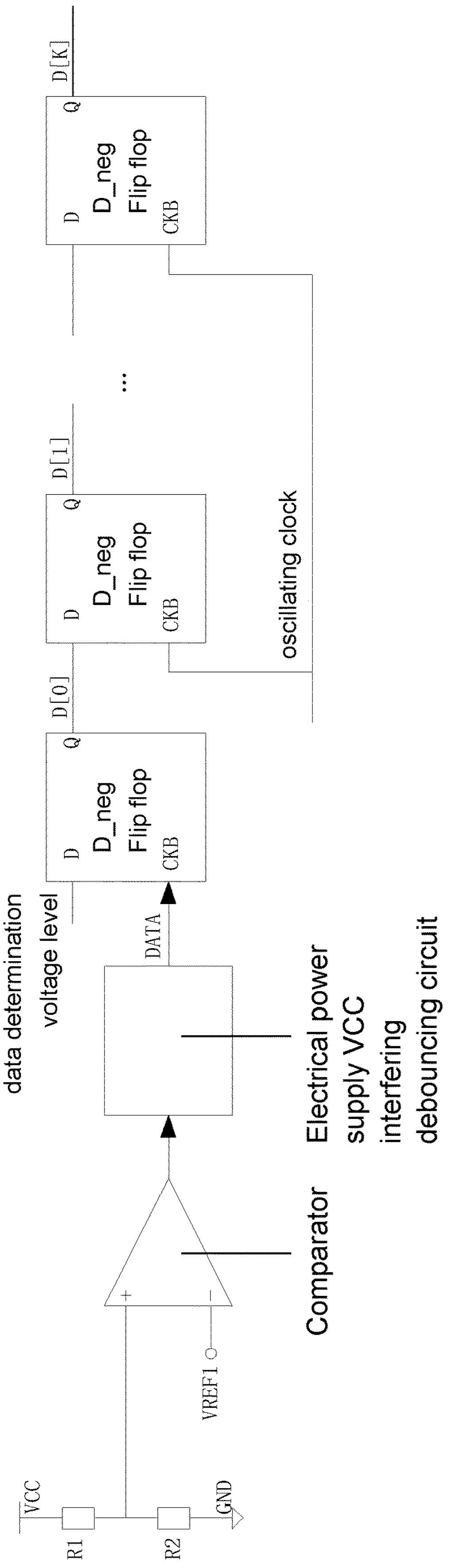
FIG. 5 is a circuit diagram of an electrical power supply VCC sampling and transmitting data according to the present invention.

FIG. 5 is a circuit diagram (of the power line data sampling and transmission module as shown in FIG. 3) of an electrical power supply VCC sampling and transmitting data. The electrical power supply VCC inputs into a positive pole of a comparator through voltage dividing resistors R1 and R2. A negative pole of the comparator is connected to a reference voltage VREF1 of the chip. The comparator determines whether there is any data input from the electrical power supply VCC, and if there is data input, an electrical power supply VCC interfering debouncing circuit, which will be described in detail in FIG. 6, will determine whether the data is valid. If interference is determined, an original data high voltage level is maintained; if it is determined that the data is valid, high/low data voltage level variations will be produced according to variations of the electrical power supply VCC. In FIG. 5, there are four input ends, namely VCC, VREF1, data determination voltage level, and oscillating clock, and one output end, namely D[K], which is simultaneously connected to the chip initial address setting by command module 400, the E-fuse module 500, and the data storage module.

Figure 6:
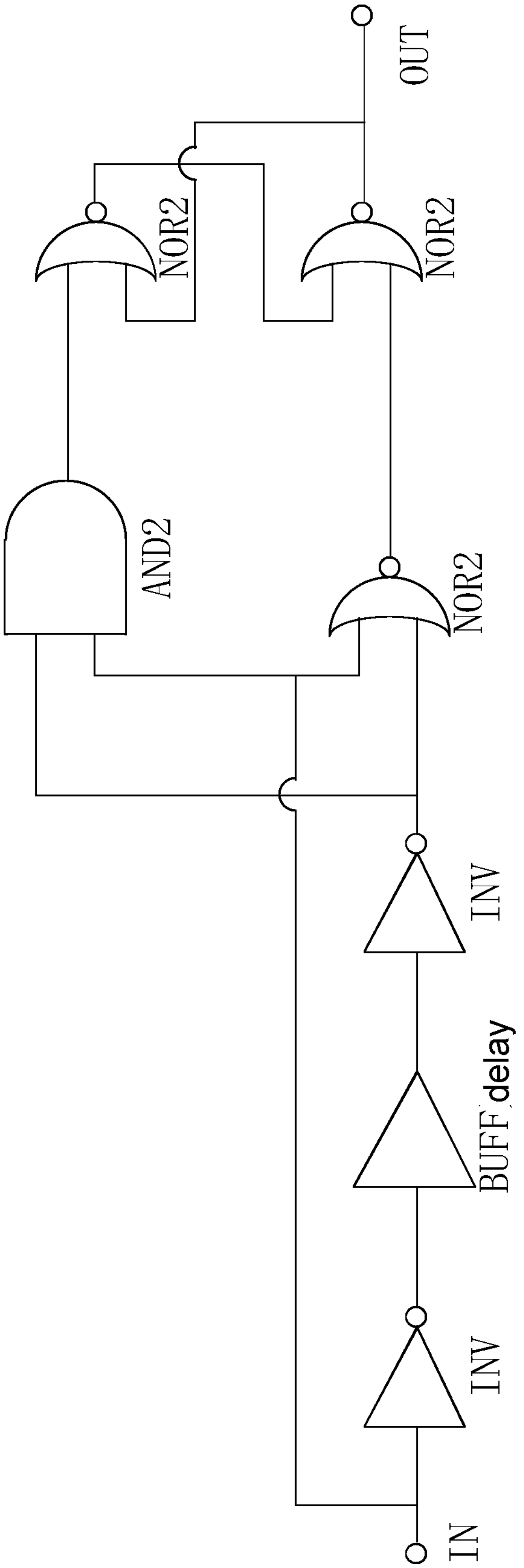
FIG. 6 is an electrical power supply VCC interfering debouncing circuit of the present invention.

FIG. 6 is an electrical power supply VCC interfering debouncing circuit of the present invention. BUFF delay is an interference time obtained by tests of the system in actual implementation. The electrical power supply VCC interfering debouncing circuit can filter interference signals smaller than the BUFF delay (as such, an OUT end maintains high voltage level output, and display data by the LEDs of the chip will not be affected), and output the electrical power supply VCC high/low voltage variations which are greater than the BUFF delay through the OUT end (as such, the OUT end outputs high/low varying voltage levels, and accurately samples display data of the chip).

Figure 7:
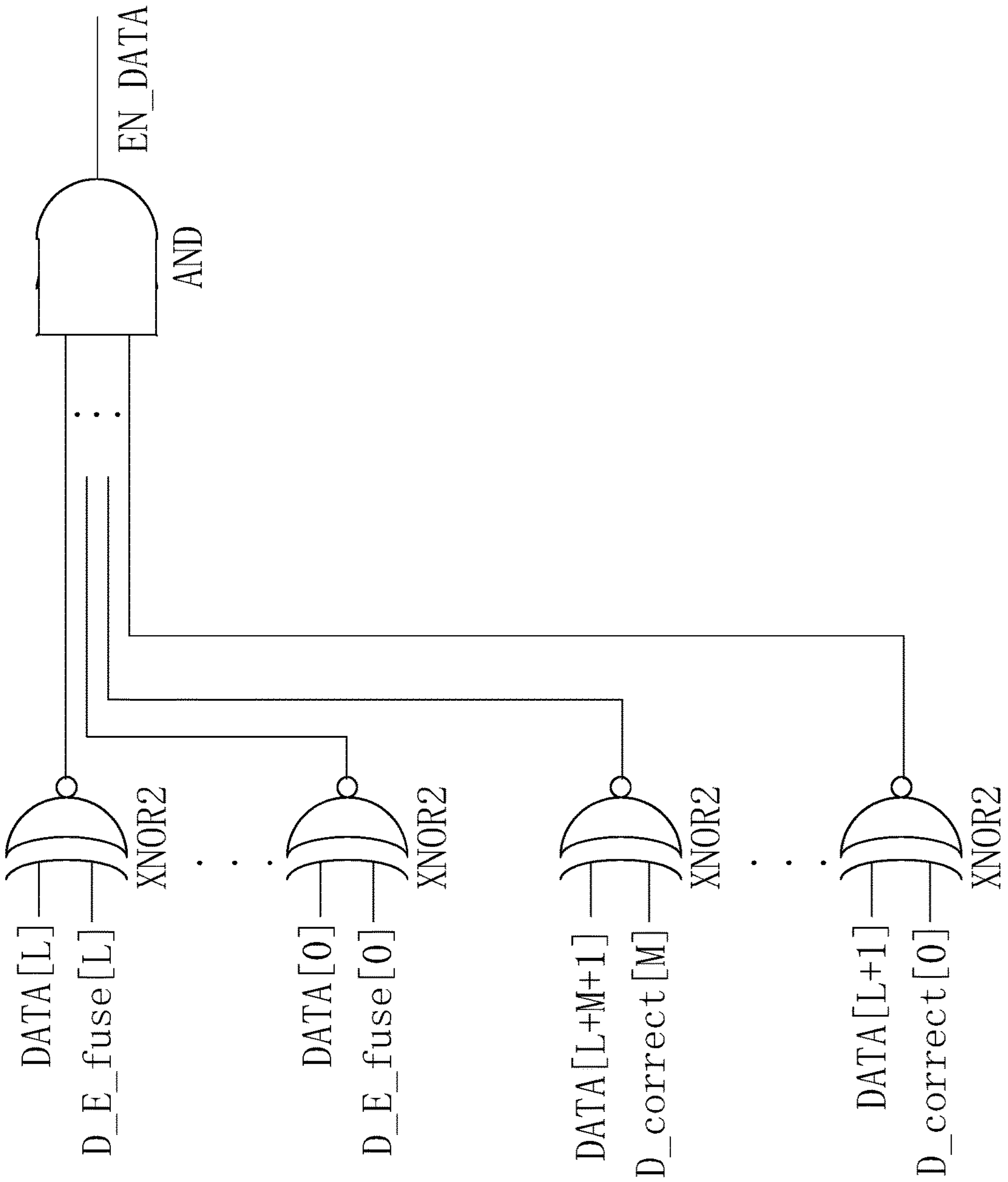
FIG. 7 is a circuit diagram according to the present invention to determine if E-fuse address of the chip is identical to an address of received data.

FIG. 7 is a circuit diagram (of the module which determines if E-fuse address of the chip is identical to an address of received data). An address (DATA [L], which is a chip initial address obtained by calculation after adding one to the address of the transmitted data from the chip initial address setting by command module 400) will be compared with a chip address (D_E_fuse[L]) of the E-fuse module 500, a calibration signal (D_correct[M]) etc. (D_correct[M] calibration signal is set by an internal circuit of the chip. System data deviation can only erroneously decode signal 4'b0110 as 4'b0000 or 4'b1111. Comparison with the calibration signal D_correct[M]=4'b0110 can prevent erroneous execution of data receiving), and if the comparison shows that they are identical, EN_DATA signal is valid (store display data of the chip), and if they are not identical, the EN_DATA signal is invalid (ignore data[N], and will not initiate storage of display data of the chip again). As shown in FIG. 3, it is known that FIG. 7 has two input ends, namely D_E_fuse[L] and DATA[L], and one output end, namely EN_DATA.

Figure 8:
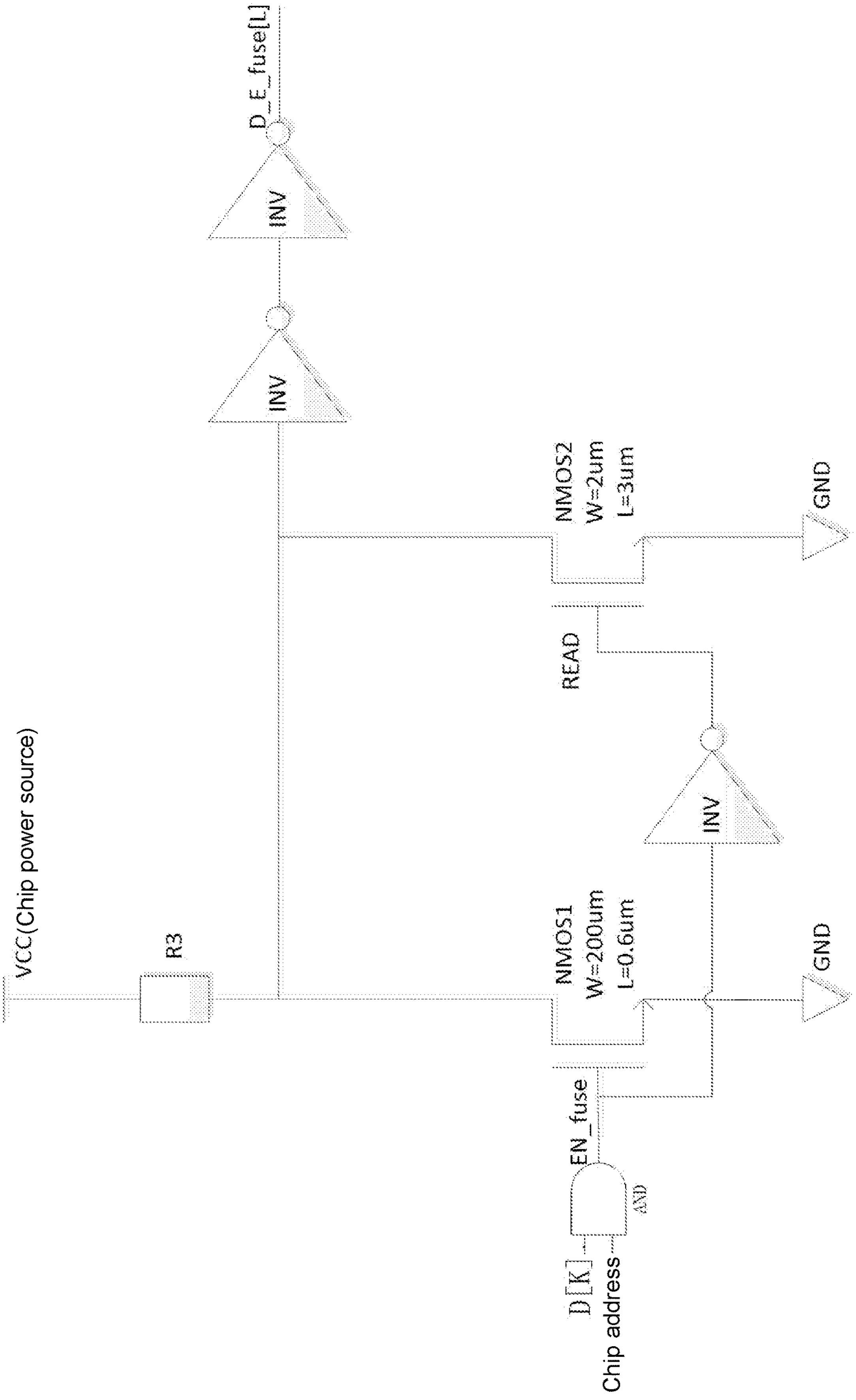
FIG. 8 is a simplified schematic diagram of the E-fuse module.

FIG. 8 is a simplified schematic diagram of the E-fuse module 500. R3 is a resistor capable of being blown out by a high current. When D[K] is received from the power line data sampling and transmission module, and it is determined that the chip address has to be blown out, EN_fuse=5V (EN_fuse is a blow out enabling signal of the E_fuse module, and is not an input end of a sampled data), a high current NMOS1 tube opens, and a high current of 60 mA exists from VCC up to GND through R3 and NMOS1, and in this situation, R3 will be blown out in 20 us time; when READ=5V and EN_fuse=0V, read the address data D_E_fuse[L], whereas NMOS2 opens and R3 is blown out (equivalent resistance is infinite), and R3 (equivalent resistance is infinite) and NMOS2 (equivalent resistance 100 k ohm) divide voltage; accordingly, D_E_fuse[L]=0V. When the chip receives data and determines that the chip address is not required to be blown out, EN_fuse=0V, the high current NMOS1 tube closes, and no high current exists from VCC up to GND through R3 an NMOS1, and in this situation, R3 maintains a low resistance of 1 ohm; when READ=5V and EN_fuse=0V, read the address data D_E_fuse[L], whereas NMOS2 opens, and R3 (equivalent resistance 1 ohm) and NMOS2 (equivalent resistance 100 k ohm) divide voltage; accordingly, D_E_fuse[L]=5V.

Figure 9:
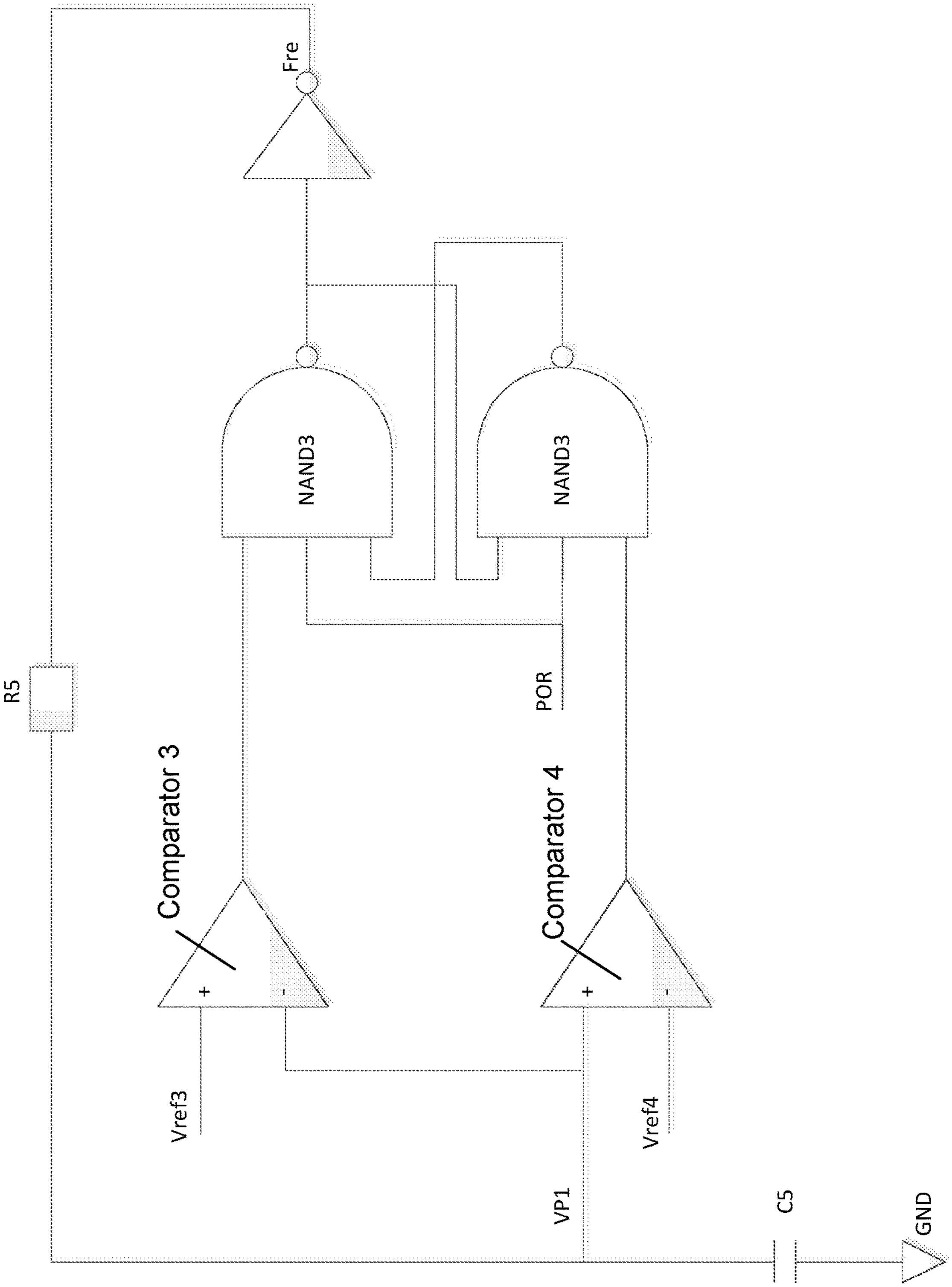
FIG. 9 is an oscillation circuit diagram.

FIG. 9 is an oscillation circuit diagram. When the chip is powered, a reset signal POR=0V, whereas an oscillation signal Fre=0V. After the chip is powered for a certain period of time, the reset signal POR=5V, a compare voltage VP1=0V; VP1 is compared with both Vref3 (approximately 3V) of a comparator 3 and Vref4 (approximately 1V) of a comparator 4; and Fre outputs 5V. VP1 charges and discharges a capacitor C5 through a resistor R5, and VP1 varies within a range between 1V and 3V. When VP1 varies from 1V to 3V, Fre=5V; when VP1 varies from 3V to 1V, Fre=0V. A clock signal of the chip is provided according to the oscillation signal Fre generated by, for example, charging and discharging time of R5 and C5.

Figure 10:
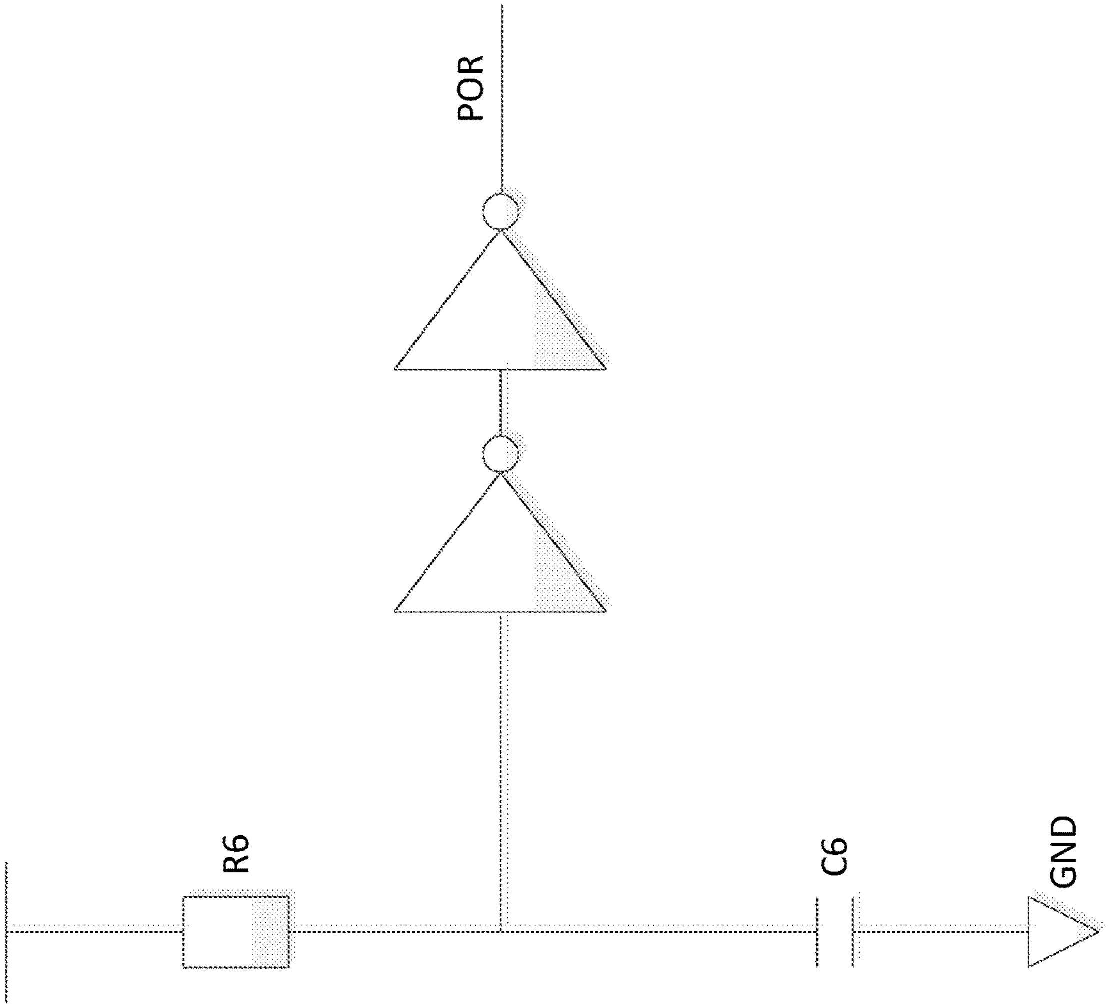
FIG. 10 is a reset circuit diagram.

FIG. 10 is a reset circuit diagram. When the chip is powered, two ends of a capacitor C6 cannot have sudden changes, therefore POR=0V; after charging of C6 by R6 for a certain period of time, POR=5V. The reset signal POR performs initialization of the chip when the chip is powered up.

Figure 11:
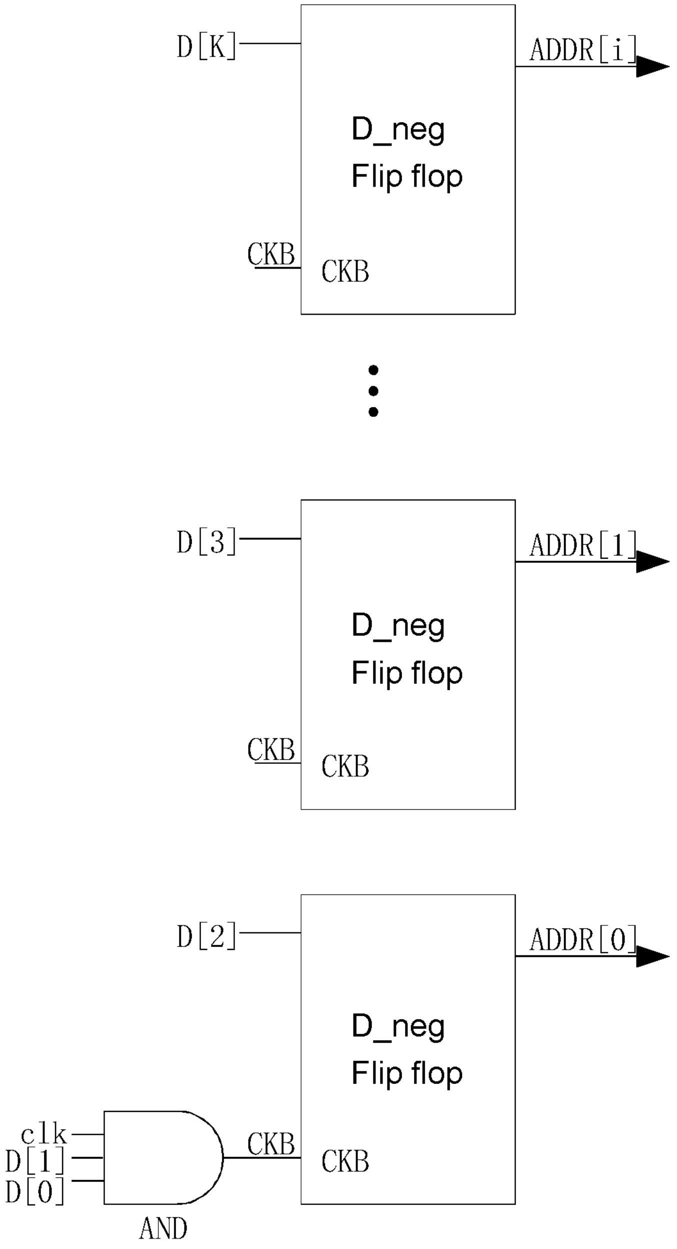
FIG. 11 is a schematic diagram of the chip initial address setting by command module.

FIG. 11 is a schematic diagram of the chip initial address setting by command module 400, which only shows setting of chip initial address by command. As shown in FIG. 5, the output signal of the power line data sampling and transmission module is D[K], and the two prior signals D[0] and D[1] are determining positions. When D[0]=D[1]=5V, the sampled data D[K] is a chip initial address setting by command data, and latched in D flip flop in clk signal falling edge, and the output signal ADDR[i] is the address of the transmitted data.

Figure 12:
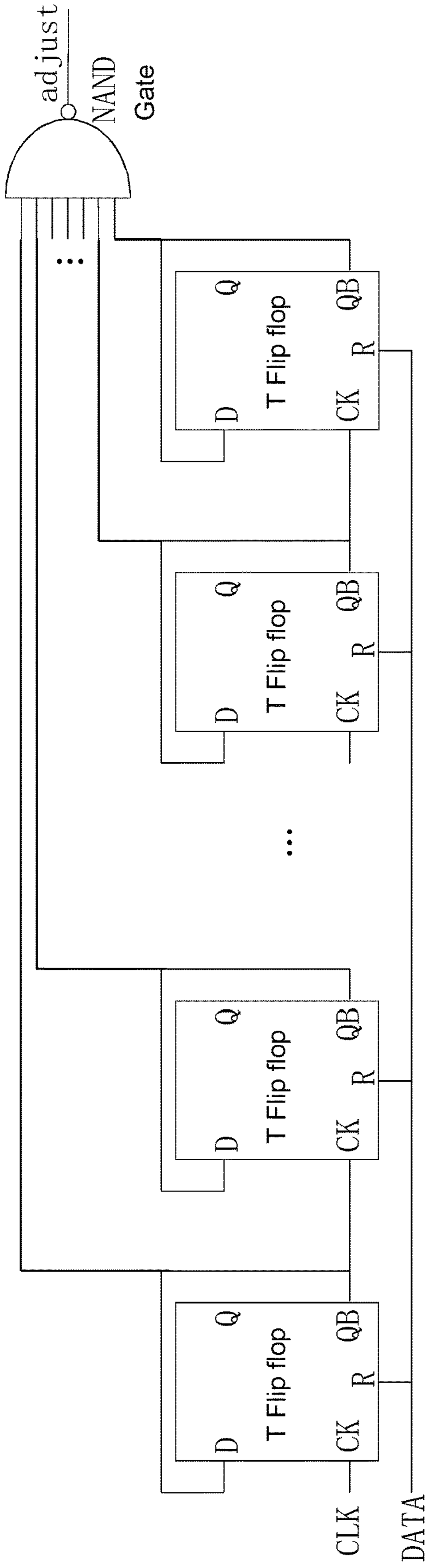
FIG. 12 is a schematic diagram of the data sampling and calibration module.

FIG. 12 is a schematic diagram of the data sampling and calibration module 300. The T flip-flops form an asynchronous counter. When DATA=0V, the T flip-flops are no longer cleared, and the CLK clock starts counting to generate a calibration signal "adjust".

The electrical power supply module outputs reference voltage or reference current to ensure that a frequency error of the oscillation circuit is 10% and a constant current output error is 5% while the chip is operating.

The dual-line cascade application system for simultaneously supplying electrical power and transmitting data according to the present invention is achieved according to the details illustrated in FIGS. 1, 3-12.

After using the present invention, a dual-line cascade application system which simultaneously supplying electrical power and transmitting data can be achieved. It is compatible to the original application system without increase in usage costs; it can increase reliability of LED display cascade application system and the display refresh rate. It is possible to use the cascade LED display application system in a safe, effective and accurate manner.

The present invention provides a dual-line cascade application system and implementation method thereof for simultaneously supplying electrical power and transmitting data. It is compatible to the original application system without increase in usage costs; it can increase reliability of LED display cascade application system and the display refresh rate. It is possible to use the cascade LED display application system in a safe, effective and accurate manner. Certainly, the present invention is not only applicable for LED display dual-line cascade application system, but it is also applicable for other cascade application systems (such as power line and data line separation and so forth).

Various changes and variations based on the technical solutions and concepts as disclosed above should be obvious to a person skilled in the art. All these changes and variations should also fall within the scope of protection of the claims of the present invention.

What is claimed is:

1. A dual-line cascade application system for simultaneously supplying electrical power and transmitting data comprising a controller, cascade chips and LED lights; the controller is connected to the cascade chips; the cascade chips are connected to the LED lights; each of the cascade chips is provided with a voltage clamp module, an electrical power supply module, a data storage module, a PWM constant current output driving circuit, an R end, a G end, a B end, a W end, a VCC/DATA end and a GND/DATA end, as well as a data sampling and calibration module, a power line data sampling and transmission module, a chip initial address setting by command module, a module which determines if E-fuse address of the corresponding cascade chip is identical to an address of received data, and an E-fuse module; the VCC/DATA end is connected to the voltage clamp module, the data sampling and calibration module and the power line data sampling and transmission module respectively; the voltage clamp module has output ends which are connected to the GND/DATA end and the electrical power supply module respectively; the electrical power supply module has an output end which is connected to the data sampling and calibration module, the power line data sampling and transmission module, the chip initial address setting by command module, the E-fuse module, the data storage module and the PWM constant current output driving circuit respectively to supply power; the power line data sampling and transmission module has an output end which is connected to the chip initial address setting by command module, the E-fuse module, and the data storage module respectively; an output end of the module which determines if E-fuse address of the corresponding cascade chip is identical to the address of received data is connected to the data storage module; input ends of the module which determines if E-fuse address of the chip is identical to an address of received data are connected to the chip initial address setting by command module and the E-fuse module respectively; the PWM constant current output driving circuit is connected to the R end, the G end, the B end and the W end;

each of the cascade chips is further provided with an oscillation circuit and a reset circuit; the oscillation circuit and the reset circuit are connected between the electrical power supply module and the power line data sampling and transmission module.

2. The dual-line cascade application system for simultaneously supplying electrical power and transmitting data as in claim 1, characterized in that: the controller is provided with a VDD end and a GND end; the VDD end and the GND end of the controller are connected to the VDD and GND ends of all the cascade chips respectively; each of the LED lights is connected to the R end, the G end, the B end and the W end of each of the cascade chips.

3. An implementation method of the dual-line cascade application system for simultaneously supplying electrical power and transmitting data according to claim 1, comprising the following steps:

Step 1: Achieve stable and accurate power and data transmission during cascade application via the voltage clamp module;

Step 2: The controller transmits data to the data sampling and calibration module of a corresponding cascade chip; data transmission criteria is changed in real time via the data sampling and calibration module for accurate data sampling and transmission; after data sampling and transmission, notify the power line data sampling and transmission module to sample and transmit the data which is transmitted to the chip initial address setting by command module, the E-fuse module, or the data storage module;

Step 3: If the data transmitted is determined by the power line data sampling and transmission module as an address writing command, write address on the E-fuse module of the chip and set chip address; otherwise proceed to step 4; wherein writing on the E-fuse module can only performed once, and data written on the E-fuse module is a chip address;

Step 4: If the data transmitted is determined by the power line data sampling and transmission module as setting system data initial address, transmit the data to the chip initial address setting by command module to set the system data initial address; otherwise, proceed to step 5;

Step 5: If the data transmitted is determined by the power line data sampling and transmission module as a display command data, the data is first transmitted to the chip initial address setting by command module which then transmits the data to the module which determines if E-fuse address of the chip is identical to an address of received data to determine if the chip address stored in the E-fuse module is identical to a chip address of the transmitted data, if yes, notify the data storage module to store a display data of a corresponding address, and the data storage module then transmits the data to the PWM constant current output driving circuit to output and display, if not, then ignore.

4. The implementation method of claim 3, wherein in step 4, after setting the system data initial address by the chip initial address setting by command module, the system data initial address is added by one after receiving a group of display command data.

* * * * *